United States Patent
Girardon et al.

(12) 
(10) Patent No.: US 6,760,518 B2
(45) Date of Patent: Jul. 6, 2004

(54) FIBER GRATING OPTICAL WAVEGUIDE DEVICE

(75) Inventors: Valérie Girardon, Brétigny-sur-Orge (FR); Carlos De Barros, Boulogne-Billancourt (FR); Isabelle Riant, Orsay (FR)

(73) Assignee: Avanex Corporation, Fremont, CA (US)

(*) Notice: Subject to any disclaimer, the term of this patent is extended or adjusted under 35 U.S.C. 154(b) by 22 days.

(21) Appl. No.: 10/036,448

(22) Filed: Jan. 7, 2002

(65) Prior Publication Data

US 2002/0090175 A1 Jul. 11, 2002

(30) Foreign Application Priority Data

Jan. 8, 2001 (EP) .............................. 01440003

(51) Int. Cl.⁷ .............................. G02B 6/34; G02B 6/02; G02B 6/16; G02B 6/22
(52) U.S. Cl. .......................... 385/37; 385/123; 385/128
(58) Field of Search .......................... 385/37, 123, 128

(56) References Cited

U.S. PATENT DOCUMENTS

| | | | | |
|---|---|---|---|---|
| 4,942,366 A | * | 7/1990 | Toda | 359/344 |
| 4,975,923 A | * | 12/1990 | Buus et al. | 372/50 |
| 5,103,456 A | * | 4/1992 | Scifres et al. | 372/50 |
| 5,991,493 A | | 11/1999 | Dawes et al. | |
| 6,204,304 B1 | * | 3/2001 | Houlihan et al. | 522/88 |
| 6,240,225 B1 | * | 5/2001 | Prohaska | 385/37 |
| 6,321,008 B1 | * | 11/2001 | Riant et al. | 385/37 |
| 6,421,472 B1 | * | 7/2002 | Moroni et al. | 385/14 |
| 6,427,041 B1 | * | 7/2002 | Strasser et al. | 385/37 |
| 6,516,118 B1 | * | 2/2003 | Brilland et al. | 385/37 |

FOREIGN PATENT DOCUMENTS

| | | |
|---|---|---|
| FR | 2 779 237 | 12/1999 |
| WO | WO 00/70379 | 11/2000 |

* cited by examiner

*Primary Examiner*—Brian Healy
*Assistant Examiner*—Tina M Lin
(74) *Attorney, Agent, or Firm*—Moser, Patterson, Sheridan, L.L.P.

(57) ABSTRACT

The present invention relates to a fiber grating filter optical waveguide device, comprising an optical fiber with an optical filter, both consisting essentially of silica, whereby said optical filter has an area with a grating region, wherein said area with a grating region is covered with a layer comprising a material having a refractive index which is the same or higher than the refractive index of the material of the optical fiber. The variation of the physic-chemical nature of said material allows to match the changes in the refractive index of the optical fiber of the optical filter when specific requirements for a high transmission spectrum of the filter are required.

6 Claims, No Drawings

FIBER GRATING OPTICAL WAVEGUIDE DEVICE

BACKGROUND OF THE INVENTION

The present invention relates to a Fiber Grating Optical Waveguide Device comprising an optical fiber with an optical filter, both consisting essentially of silica, whereby said optical filter has an area with a Bragg grating region and a process for preparing a Fiber Grating Optical Waveguide Device according to the invention.

Optical filters have numerous applications in optical communications and in particular, they can be used for providing wavelength selectivity and tuning in WDM (wavelength division multiplexing) and DWDM (dense wavelength division multiplexing) systems. For this purpose, transmission filters are based on grating structures. Fibre grating structures as defined in the field of optics and hence in the following context comprise inter alia FBG (fiber Bragg grating), SBG (slanted Bragg grating), LPG (long period grating) and mode converters offer near ideal filter response and high channel isolation. The specific "grating" is selected according to the requirements in the specific case. Furthermore they can be used in various sensor applications.

In the case of gain equalization it is often preferred to use a Slanted Bragg Grating (SBG) because it exhibits the absence of back-reflection at the filtering wavelength. Furthermore, the use of optical isolators is not mandatory. The SBG is a standard fibre Bragg grating tilted during photoinscription with an angle between the grating fringes and the normal of the fibre axis. This SBG couples most of the fibre-guided mode into radiation modes or cladding modes in a counter-propagating direction. The envelope of couplings into the different cladding modes yields the filter shape. The envelope of couplings is defined by the specific fibre design. It is for example known from FR-A-9806904, to provide a photosensitive cladding to reduce the spectral width of the grating and a reduced photosensitivity in the core to decrease the back reflection, whereby the grating can be short (800 $\mu$m) or chirped to suppress the modulation due to coupling into discrete modes. By chirping, varying period fringes along the grating length, or by shortening the grating, each discrete cladding mode is enlarged.

It is often preferred to obtain a high transmission spectrum of the filter. In order to raise the coupling into the different cladding modes by the maximum photoinduced refractive index variation of the fiber material, the length of the grating has to be increased or the chirp rate of the grating has to be decreased. However, both methods lead to the disadvantage, that the discrete number of cladding modes induce unwanted discrete unitary filters in the transmission spectrum.

SUMMARY OF THE INVENTION

The underlying problem of the invention is therefore to avoid the disadvantages of the filters in the state of the art and to provide a fiber grating optical waveguide device which allows the light to be coupled into a continuum of radiation modes.

The problem underlying the invention is solved by a fiber grating filter optical waveguide device, comprising an optical fiber with an optical filter, both consisting essentially of silica, whereby said optical filter has an area with a grating region, wherein said area with a grating region is covered with a layer comprising a material having a refractive index which is the same or higher than the refractive index of the material of the optical fiber.

This leads to a layer of a material around the optical filter, which matches the refractive index in the cladding of the optical fiber. Thereby the transmitted light is coupled into a continuum of radiation modes.

In a preferred embodiment, the optically transmissive material smoothens the transmission spectrum of the filter.

Advantageously, the optically transmissive material is made from a monomeric and/or oligomeric precursor material, thus allowing to use a great variety of potential precursor materials selected according to the specific requirements. Furthermore, these precursors are generally more easily soluble in a variety of solvents than for example polymeric or amorphous materials.

In a further preferred embodiment, the precursor material contains hydrolyzable functional groups. Therefore easy accessible and cheap water-based solution can be used.

It is further preferred that the precursor material and the optically transmissive material contain at least one element selected from Si, Al, Ti, Sn, Ni and/or mixtures thereof.

In an advantageous embodiment, the precursor material contains organic groups, thus allowing to change, to vary and to determine in a facile manner the physico-chemical and therefore the optical properties of the final layer by respective selection of the organic groups R. Organic groups as understood within the scope of the invention consists mainly of C and H atoms, but may also include groups and moieties with heteroatom functionalities like N, S, P, Si, As etc.

In a further advantageous embodiment, the material is essentially attached via covalent bonds on the surface of the grating region. Therefore, the resulting layer is solidly fixed on the fiber surface and ensures furthermore a stable behaviour of the whole filter without filter deformation induced by mechanical stress.

It is preferred that the grating of the grating region is a Slanted Bragg grating, which is particularly advantageous, for gain equalization applications (small back reflection).

It is advantageous that the optical fiber has a core region and an outer region, whereby the core region displays a lower photosensitivity with respect to the outer region to decrease the back reflection.

The problem of the invention is further solved by a process for fabricating an optical device according to the invention comprising the following steps:

(a) Preparing a solution of precursor species of the material (b) Bringing in contact the solution with the surface of the optical fiber comprising the grating region.

(c) Drying and curing of the optical fiber.

Bringing in contact according to step b) means for example dipping or spraying, or other methods known by a person skilled in the art. The bringing in contact occurs advantageously at room temperature, but higher or lower temeperatures work as well.

It is further preferred to clean the fiber surface before bringing in contact with the solution.

Advantageously, the curing takes place in a temperature range of from 60° to 120° C.

It is understood that the aforementioned advantages and the features of the invention explained in the following, are not only used in the specifically described combination, but can also be used by a person skilled in the art in other combinations or alone, without exceeding the scope of the invention.

DESCRIPTION OF THE INVENTION

In the following, the invention is described in detail.

An index matching medium surrounding the SBG allows that the light passing through the fiber can be coupled into a continuum of radiation modes and smooth the filter spectrum. This index matching medium forms an outer layer around the filter and is obtainable by a condensation reaction between the silanol groups present on the silica fiber surface and the hydrolyzable groups of the monomeric and/or oligomeric precursor material. The monomeric and/or oligomeric precursors are mainly organometallic compounds, as for example organosilanes or titanium and/or aluminiumalcoholates, tinorganocompounds, nickel oxydes, or other molecular precursors known by a person skilled in the art and mixtures thereof. This interface of the index matching medium confers the suitable refractive index which permits to smooth the filter spectrum. The surface coating is fixed on the fiber by forming covalent bonds and ensures a stable behaviour without filter deformation induced by mechanical stress.

In the case of using organosilanes, their general formula is $R_n SiX_{(4-n)}$ where X is a hydrolyzable group (as a non-limiting example, the following groups are preferred: halogen, alkoxy OR', aryloxy or amine, wherby R' is a organic functional group which may also contain heteroatoms). Following hydrolysis (generated in-situ or by the addition of water), a reactive silanol group—SiOH is formed which is able to condense with the silanol groups of the silica fiber surface to form siloxane linkages. By hydrolysis of the organosilanes an alcohol is formed, such as methanol or ethanol when R' is methyl and ethyl respectively.

An optional cleaning step allows to activate the hydroxyl groups on the silica surface and to remove the physisorbed water and the contaminants.

The variation in the organic group R' controls the characteristics of the refractive index of the layer.

Stable condensation products via well known sol-gel processes are also obtained by using for example the corresponding aluminium and titanium compounds as mentioned above.

Molecules of water are synthesized during the condensation of the silanol on the silica surface and a complete condensation is obtained with the help of a final step of heating. A crosslinked or linear polymeric product is obtained.

By applying such a permanent layer of an index matching material, the overall optical properties of the optical fiber with the filter are changed according to the specific needs.

Step b) of the process according to the invention is explained in detail in the exemplary case of using silane compounds:

An aqueous alcoholic solution including the silane is obtained by mixing the silane with an alcohol, for example methanol, ethanol, isopropanol etc. and with a quantity of water. The organic solvent is properly selected in order to ensure good solubility of the respective silane. The additional water controls the liberation of the silanol groups from the organosilane dissolved into the alcohol. The condensation efficiency depends on the chemical structure of the organosilane, i.e. the silane group and the organic chain, and is related to the chemical process of the condensation reaction. The pH of the aqueous alcohol solution modifies the kinetic rate of the hydrolysis-condensation and the structure of the polymer layer. The morphology of the material (linear chains or dense crosslinked polymer) can be adjusted by adaptation of the experimental conditions.

The portion of the filter is dipped into the aqueous alcohol solution including the silane during 5–20 minutes. In another preferred embodiment, the solution is sprayed onto the fiber. The curing step of the silane layer for a few minutes in a temperature range from 60–120° C., preferably from 80–100° C. will achieve the complete condensation.

By using specifically selected solvents, even polymeric organic side-chains of organo-silicon compounds are usable in the process according to the invention. The covalent bonds of the siloxane linkages ensure a very good adhesion of the layer which is furthermore insensitive to temperature modification and to humidity. This interface stability assures that its optical property is conserved during the natural ageing of the fiber grating optical waveguide device.

What is claimed is:

1. Fiber grating filter optical waveguide device, comprising an optical fiber with an optical filter, both consisting essentially of silica, whereby said optical filter has an area with a grating region, wherein the fiber grating filter is a slanted Bragg grating filter and said area with a grating region is covered with a layer comprising a material having a refractive index which is the same or higher than the refractive index of the material of the optical fiber cladding and the material is attached by covalent bonds of the material.

2. Device according to claim 1, wherein the material is made from a monomeric and/or oligomeric precursor material.

3. Device according to claim 1, wherein the material contains hydrolyzable functional groups.

4. Device according to claim 1, wherein the precursor material and the material contain at least one element selected from Si, Al, Ti, Sn, Ni and/or mixtures thereof.

5. Device according to claim 1, wherein the precursor material and the material contain organic groups.

6. Fiber grating filter optical waveguide device, comprising an optical fiber with an optical filter, both consisting essentially of silica, whereby said optical filter has an area with a grating region, wherein the fiber grating filter is a slanted Bragg grating filter and said area with a grating region is covered with a layer comprising a material having a refractive index which is the same or higher than the refractive index of the material of the optical fiber cladding and the material is attached by covalent bonds of the material, wherein the optical fiber has a core region and an outer region, whereby the core region displays a lower photosensitivity with respect to the outer region.

* * * * *